US008844349B2

(12) United States Patent
Morino et al.

(10) Patent No.: US 8,844,349 B2
(45) Date of Patent: Sep. 30, 2014

(54) THERMAL TYPE AIR FLOW METER HAVING A REINFORCING STRUCTURE PROVIDED ON THE BASE MEMBER BETWEEN THE BOARD FIXING PART AND THE SECONDARY PASSAGE CONSTITUTING PART

(75) Inventors: Takeshi Morino, Hitachinka (JP); Chihiro Kobayashi, Naka (JP); Yuki Okamoto, Hitachinaka (JP); Tsutomu Kono, Kawasaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 482 days.

(21) Appl. No.: 13/228,039

(22) Filed: Sep. 8, 2011

(65) Prior Publication Data

US 2012/0060599 A1    Mar. 15, 2012

(30) Foreign Application Priority Data

Sep. 9, 2010   (JP) ................................. 2010-201525

(51) Int. Cl.
   *G01F 1/68*   (2006.01)
   *G01F 5/00*   (2006.01)
   *G01F 1/684*  (2006.01)

(52) U.S. Cl.
   CPC ................ *G01F 5/00* (2013.01); *G01F 1/6842* (2013.01)
   USPC .................................... 73/204.26; 73/204.22

(58) Field of Classification Search
   None
   See application file for complete search history.

(56) References Cited

U.S. PATENT DOCUMENTS

| 4,976,145 | A  | * | 12/1990 | Kienzle et al. ............. 73/204.22 |
|-----------|----|---|---------|--------------------------------------|
| 6,012,432 | A  |   | 1/2000  | Igarashi et al. |
| 6,182,639 | B1 |   | 2/2001  | Igarashi et al. |
| 6,666,082 | B2 | * | 12/2003 | Watanabe et al. .......... 73/204.22 |
| 6,679,113 | B2 | * | 1/2004  | Uramachi .................. 73/204.22 |
| 6,729,181 | B2 | * | 5/2004  | Mayer et al. ............... 73/204.22 |
| 7,523,659 | B2 |   | 4/2009  | Okamoto et al. |

(Continued)

FOREIGN PATENT DOCUMENTS

| CN | 101071072 A | 11/2007 |
|----|-------------|---------|
| CN | 101424555 A | 5/2009  |

(Continued)

OTHER PUBLICATIONS

Extended European Search Report dated Feb. 7, 2012 (three (3) pages).

(Continued)

*Primary Examiner* — Harshad R Patel
(74) *Attorney, Agent, or Firm* — Crowell & Moring LLP

(57) ABSTRACT

A thermal type air flow meter that is capable of suppressing deformation of a base member at the time of molding is disclosed, to thereby secure dimension accuracy and reduce an influence of a dimension change on measuring accuracy. The meter includes a housing member placed in an intake passage of an internal combustion engine, and a base member fixed to the housing member and includes a secondary air passage into which part of air passing through the intake passage flows. The base member is a plate-like resin molded component formed of a synthetic resin material and includes a reinforcing structure integrally formed between a board fixing part to which a circuit board is fixed; and a secondary passage constituting part formed at a leading end part of the board fixing part, the reinforcing structure enhancing strength of the base member.

22 Claims, 11 Drawing Sheets

(56) References Cited

U.S. PATENT DOCUMENTS

| | | | |
|---|---|---|---|
| 7,963,161 B2 | 6/2011 | Morino et al. | |
| 8,573,041 B2 | 11/2013 | Saito et al. | |
| 2002/0092349 A1* | 7/2002 | Watanabe et al. | 73/204.22 |
| 2003/0037610 A1* | 2/2003 | Roeckel et al. | 73/204.22 |
| 2003/0074963 A1* | 4/2003 | Uramachi | 73/204.22 |
| 2004/0055375 A1 | 3/2004 | Zurek et al. | |
| 2004/0055376 A1* | 3/2004 | Thompson et al. | 73/204.22 |
| 2004/0060354 A1* | 4/2004 | Watanabe et al. | 73/204.22 |
| 2004/0069060 A1* | 4/2004 | Bogdanov et al. | 73/204.22 |
| 2009/0000366 A1 | 1/2009 | Uramachi | |
| 2009/0126477 A1 | 5/2009 | Saito et al. | |
| 2012/0000280 A1* | 1/2012 | Kishikawa et al. | 73/204.22 |

FOREIGN PATENT DOCUMENTS

| | | |
|---|---|---|
| CN | 101441097 A | 5/2009 |
| CN | 101650204 A | 2/2010 |
| GB | 2 393 254 A | 3/2004 |
| JP | 5-302839 A | 11/1993 |
| JP | 2002-107201 A | 4/2002 |
| JP | 2004-117338 A | 4/2004 |
| JP | 3523022 B2 | 4/2004 |
| JP | 2009-8619 A | 1/2009 |

OTHER PUBLICATIONS

Japanese Office Action dated Oct. 29, 2013 (two (2) pages).
Chinese Office Action dated Sep. 12, 2013 (six (6) pages).

\* cited by examiner

Cross-section A-A

Cross-section B-B

Cross-section C-C

THERMAL TYPE AIR FLOW METER HAVING A REINFORCING STRUCTURE PROVIDED ON THE BASE MEMBER BETWEEN THE BOARD FIXING PART AND THE SECONDARY PASSAGE CONSTITUTING PART

BACKGROUND OF THE INVENTION

1. Field of the Invention

The present invention relates to a thermal type air flow meter that measures the flow rate of air, for example, to a thermal type air flow meter that is attached to an intake pipe of an internal combustion engine and measures the flow rate of intake air supplied to an engine.

2. Background Art

A thermal type air flow meter that measures the flow rate of intake air supplied to an internal combustion engine is attached for use to part of an intake system of an internal combustion engine. The thermal type air flow meter has a mechanism of, for example, causing a flow rate detecting element such as a heat-generating resistor to generate heat and measuring the flow rate of passing air on the basis of the amount of heat radiation therefrom to the air. Accordingly, it is necessary to consider protection of the flow rate detecting element from contaminating substances and other factors during long-term use and securement of the flow rate measuring accuracy. Further, it is also necessary to consider intake air pulsations such as a backward flow that are generated in an intake pipe of the internal combustion engine when the intake air is pulsated by opening/closing of an intake/exhaust valve of an engine and the intake pipe resonates with the rotation frequency of the engine.

In a conventional thermal type air flow meter included in an internal combustion engine, JP Patent No. 3523022 describes that a flow rate detecting element, which is placed in a secondary air passage, is protected from contaminating substances, a backward flow, and other factors. Further, in recent years, from the aspect of purification of exhaust gas and improvement of fuel efficiency, highly accurate measurement of an intake air flow rate is required, so that a thermal type air flow meter that accurately measures even a backward flow generated in an intake pipe is necessary.

In addition, with regard to a thermal type air flow meter having such a rib structure as described in the present invention, JP Patent Publication (Kokai) No. 05-302839 A (1993) proposes a structure in which a rib is provided on an element rear surface in order to reinforce resistance to vibrations of a cantilever-like element. Further, JP Patent Publication (Kokai) No. 2002-107201 A can be exemplified as a countermeasure against deformation due to a sink occurring at the time of injection molding. According to this countermeasure, such a sink occurring at the time of injection molding is reduced by providing a rib, and the degree of flatness of an opposed surface is accordingly improved, whereby air is prevented from leaking from an insertion part of a flow meter into an intake system.

A thermal type air flow meter measures a backward flow in a state where a detecting element is placed inside of a secondary air passage, and hence the secondary air passage of the thermal type air flow meter is required to have a complicated structure including a bent passage part and a narrowed-down shape. Meanwhile, a reduction in cost of the thermal type air flow meter is demanded from the market at the same time. That is, it is necessary to overcome a contradictory problem that the complicated structure is required while the reduction in cost is aimed at at the same time.

In order to achieve the complicated structure of the secondary air passage, a conceivable idea involves increasing the number of components and combining the components to thereby constitute the secondary air passage. The increase in the number of components, however, leads to an increase in cost, and in order to achieve the reduction in cost, it is necessary to achieve the complicated structure without increasing the number of components. This enables not only a reduction in cost of the components but also a reduction in assembly man-hours, so that it is possible to reduce cost of the thermal type air flow meter or suppress an increase in cost thereof.

Taking the structure described in JP Patent No. 3523022 as an example, the thermal type air flow meter includes, as main components, six components of 1) the flow rate detecting element, 2) a housing, 3) a circuit board, 4) a metal base, 5) a secondary air passage member, and 6) a cover.

Among the six components, components mainly constituting the secondary air passage are two components of a portion of the metal base and the secondary air passage member. The secondary air passage member is formed by resin molding, and hence a complicated passage structure is easy to achieve.

In contrast, the metal base is a component having the portion that constitutes the secondary air passage and also having another portion that has a function of bonding and fixing the circuit board, the housing, and other components. In addition, the metal base is formed by pressing a flat plate-like metal material, and hence the metal base is advantageous to maintain a flat surface for the bonding and the like but is disadvantageous to achieve the complicated structure of the secondary air passage.

Accordingly, it is conceivable to form by resin molding only a portion of the secondary air passage constituted by the metal base member similarly to the secondary air passage member, but in order to place the flow rate detecting element inside of the secondary air passage, this portion needs to be newly prepared as a separate component, resulting in the increase in the number of components and the increase in assembly man-hours, and the increase in cost of the thermal type air flow meter cannot be avoided.

In order to solve these problems, it is conceivable to form the metal base as a resin base by resin molding, but the resin easily becomes thicker in the portion of the secondary air passage having the complicated structure, whereas the portion for bonding and fixing the circuit board, the housing, and other components is desired to be thin.

Under the circumstance, if such a thick part and such a thin part are formed as the same molded component, thermal contraction becomes uneven between the thick part and the thin part at the time of the molding, and a warpage phenomenon may occur at a boundary between the thick part and the thin part. This warpage deformation causes a trouble in bonding properties of the housing and the circuit board, and moreover, variations in a warpage amount lead to variations in a shape of a flow rate measuring unit. As a result, a new problem arises that the flow rate measuring accuracy also varies.

The present invention has been made in view of the above-mentioned points, and therefore has an object to provide a thermal type air flow meter that is capable of suppressing deformation of a base member at the time of molding, to thereby secure dimension accuracy and reduce an influence of a dimension change on measuring accuracy, thus enabling highly accurate measurement of an air flow rate.

SUMMARY OF THE INVENTION

In order to solve the above-mentioned problems, the present invention provides a thermal type air flow meter including: a housing member placed in an intake passage of an internal combustion engine; a plate-like base member that is fixed to the housing member and includes a secondary passage into which part of air passing through the intake passage flows; a flow rate detecting element placed in the secondary passage; and a circuit board that is electrically connected to the flow rate detecting element, receives an input of an amount of heat radiation from the flow rate detecting element, and outputs a signal according to an air flow rate. The base member is formed of a synthetic resin material and includes: a board fixing part to which the circuit board is fixed; a secondary passage constituting part that is integrally formed so as to be continuous with a leading end part of the board fixing part and constitutes the secondary passage in cooperation with the housing member; and a reinforcing structure that is provided at at least a connection portion between the board fixing part and the secondary passage constituting part and enhances strength of the base member.

With the thermal type air flow meter according to the present invention, the base member is formed of the synthetic resin material and includes: the board fixing part to which the circuit board is fixed; the secondary passage constituting part that is integrally formed so as to be continuous with the leading end part of the board fixing part and constitutes the secondary passage in cooperation with the housing member; and the reinforcing structure that is provided at at least the connection portion between the board fixing part and the secondary passage constituting part and enhances the strength of the base member. Accordingly, the strength of the flat plate-like base member is enhanced by the reinforcing structure.

As a result, at the time of molding the base member including: the board fixing part formed of a thin part having a substantially constant resin thickness; and the secondary passage constituting part including a thick part for forming the secondary passage, even in the case where thermal contraction is uneven between the thin part and the thick part, warpage deformation of the base member occurring at a boundary between the thick part and the thin part can be suppressed.

Accordingly, it is possible to prevent a trouble of attachment to the housing member and a trouble of attachment of the circuit board due to the warpage deformation and also possible to prevent variations in the flow rate measuring accuracy.

BRIEF DESCRIPTION OF THE DRAWINGS

FIG. 3A is a view illustrating the base member observed from its surface joined to a housing member, and FIG. 3B is a cross-sectional view of FIG. 3A taken along the line A-A.

FIG. 4A is a cross-sectional view corresponding to FIG. 3B, and FIG. 4B is an enlarged view illustrating a main part of FIG. 4A.

FIG. 5A is a cross-sectional view corresponding to FIG. 3B, and FIG. 5B is an enlarged view illustrating a main part of FIG. 5A.

FIG. 6A is a front view illustrating the base member observed from its surface joined to the housing member, FIG. 6B is a side view observed from an upstream side in a forward flow direction, and FIG. 6C is a plan view.

FIG. 7A is a front view illustrating the base member observed from its surface joined to the housing member, FIG. 7B is a side view observed from the upstream side in the forward flow direction, FIG. 7C is a plan view, and FIG. 7D is a cross-sectional view of FIG. 7A taken along the line B-B.

FIG. 8A is a front view illustrating the base member observed from its surface joined to the housing member, FIG. 8B is a side view observed from the upstream side in the forward flow direction, FIG. 8C is a plan view, and FIG. 8D is a cross-sectional view of FIG. 8A taken along the line C-C.

FIG. 9A is a front view illustrating the base member observed from its surface joined to the housing member, FIG. 9B is a side view observed from the upstream side in the forward flow direction, and FIG. 9C is a plan view.

FIG. 10A is a front view illustrating the base member observed from its surface joined to the housing member, FIG. 10B is a side view observed from the upstream side in the forward flow direction, and FIG. 10C is a plan view.

DETAILED DESCRIPTION OF THE PREFERRED EMBODIMENTS

Embodiments of the present invention are described in detail with reference to the attached drawings.

First, an operation principle of a representative thermal type air flow meter including a heat-generating resistor is described as an example of an intake air measuring apparatus.

Figure 11:
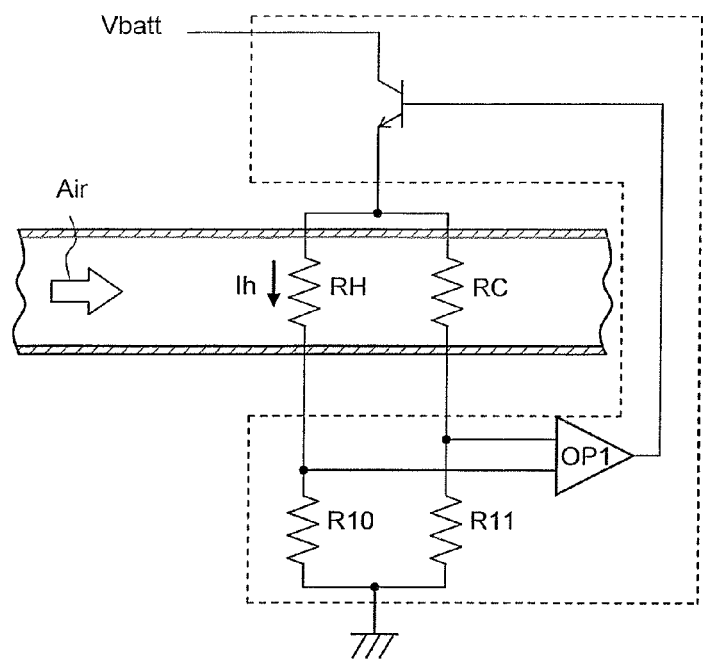
FIG. 11 is a diagram illustrating an operation principle of the thermal type air flow meter.

FIG. 11 is a schematic configuration circuit diagram illustrating the operation principle of the thermal type air flow meter.

A drive circuit of the thermal type air flow meter is roughly formed of a bridge circuit and a feedback circuit. The bridge circuit is constructed by a heat-generating resistor RH for measuring an intake air flow rate, a temperature-sensitive resistor RC for compensating an intake air temperature, and resistors R10 and R11, and a heating current Ih is caused to flow through the heat-generating resistor RH such that a constant temperature difference is maintained between the heat-generating resistor RH and the temperature-sensitive resistor RC, while performing feedback using an operational amplifier OP1, whereby an output signal V2 according to the air flow rate is outputted. Specifically, in the case where the flow rate is high, an amount of heat taken away from the heat-generating resistor RH is large, and hence a larger amount of the heating current Ih is caused to flow. In contrast to this, in the case where the flow rate is low, the amount of heat taken away from the heat-generating resistor RH is small, and hence the amount of the heating current Ih can be small.

Next, a configuration of a thermal type air flow meter according to the present invention is described with reference to FIG. 1.

Figure 1:
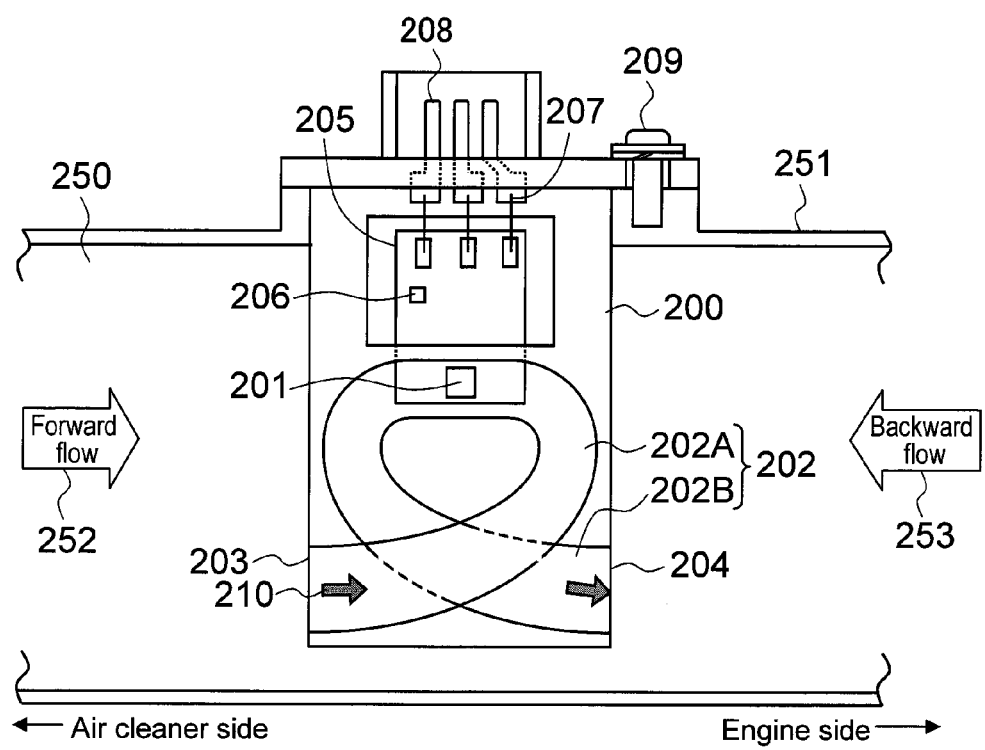
FIG. 1 is a cross-sectional view illustrating a thermal type air flow meter.

In a primary air passage 250 constituted by an intake pipe constituting member 251, the left side of FIG. 1 corresponds to an air cleaner (not illustrated) side, and the right side thereof corresponds to an engine (not illustrated) side. With regard to an air flow direction, the air flow from the left side of FIG. 1 to the right side thereof is the air flow in the forward direction, is generally referred to as a forward flow 252, and corresponds to a normal air flow when the air is taken into the engine.

In contrast to this, the air flow from the right side of FIG. 1 to the left side thereof is the air flow in the backward direction, and is generally referred to as a backward flow 253. The backward flow 253 is less likely to be generated in normal engine operation conditions. In the state where the intake air is pulsated by opening/closing of an intake/exhaust valve of the engine, if the rotation frequency of the engine and an n-th order wave having a vibration frequency specific to an intake pipe are synchronized with each other in a high-load state where a throttle valve (not illustrated) is opened to a large degree, the pulsation amplitude of the intake air pulsations becomes larger, and the backward flow 253 is generated. Such a phenomenon is generally known.

In recent years, for exhaust gas regulations and reduced fuel consumption, there is a demand to measure with high accuracy the intake air flow rate. The thermal type air flow meter is strongly required to enable highly accurate measurement of the intake air flow rate in which the air flow rate of even the backward flow 253 is measured.

Similarly, a thermal type air flow meter 200 illustrated in FIG. 1 includes a flow rate detecting element 201 having a function of not only measuring the intake air flow rate but also detecting the flow direction, to thereby measure the air flow rate of the forward flow 252 and the air flow rate of the backward flow 253 in distinction from each other. It should be noted that a known technique is used for a method of measuring the forward flow 252 and the backward flow 253, and hence description of the method is omitted in the present invention.

The flow rate detecting element 201 is provided inside of a secondary air passage (secondary passage) 202. A passage entrance 203 of the secondary air passage 202 is opened so as to be opposed to the forward flow direction, a passage exit 204 thereof is opened so as to be opposed to the backward flow direction, and the secondary air passage 202 has a passage structure that facilitates introduction of each air flow into the secondary air passage 202. The flow rate detecting element 201 is mechanically fixed and electrically connected onto a circuit board 205 constituting a drive circuit of the thermal type air flow meter 200, similarly to an electronic circuit component 206 such as an IC chip.

The circuit board 205 is electrically connected to a connector terminal 208 via an aluminum wire 207, receives inputs from a power supply and a ground, and outputs an air flow rate signal to the outside. The thermal type air flow meter 200 is mechanically connected to the intake pipe constituting member 251 by a fixing member such as a screw 209.

Figure 2:
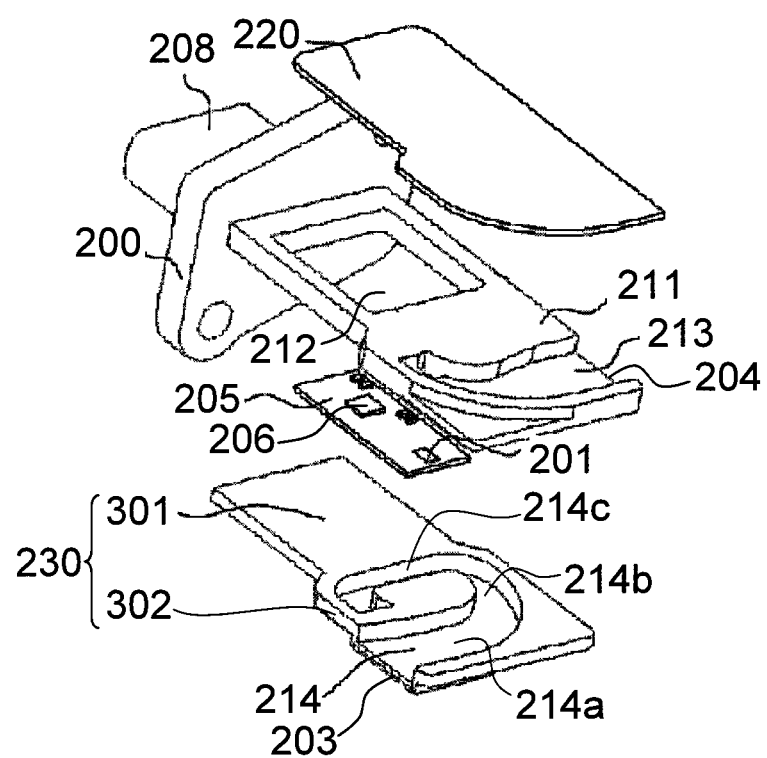
FIG. 2 is a development view illustrating components of FIG. 1.

FIG. 2 is a component development view illustrating a component structure of the thermal type air flow meter illustrated in FIG. 1.

The thermal type air flow meter 200 includes, as main components, four components of a housing member 211, a cover member 220, the circuit board 205, and a base member 230.

The housing member 211 is formed of a molded component of a synthetic resin such as plastic or a metal cast component, and is constituted by a substantially rectangular plate-like member having a predetermined plate thickness. The housing member 211 extends in a direction orthogonal to the air flow inside of the intake pipe constituting member 251, and is attached such that both flat surfaces thereof are positioned along the air flow. A flange part for fixing the intake pipe constituting member 251 and the connector terminal 208 for electrically connecting the circuit board 205 with an external device are provided in a base end part of the housing member 211.

The housing member 211 includes: a base member attachment surface on one side, on which the base member 230 is attached; and a cover member attachment surface on another side, on which the cover member 220 is attached. An opening hole 212 is formed in the base end part of the housing member 211, and the electronic circuit component 206 on the circuit board 205 fixed to the base member 230 can be inserted into the opening hole 212. A housing groove part 213 is provided on the cover member attachment surface in the leading end part of the housing member 211, and the housing groove part 213 forms a second passage part 202B of the secondary air passage 202 in cooperation with the cover member 220.

The housing groove part 213 is formed so as to extend in the forward flow direction from one side in the shorter-side direction located on the upstream side in the forward flow direction toward another side in the shorter-side direction located on the downstream side in the forward flow direction. An upstream-side end of the housing groove part 213 is opened so as to pass through to the base member attachment surface side, and a downstream-side end thereof is formed so as to be continuous up to an end part on the another side in the shorter-side direction. Then, the cover member 220 is joined and combined with the cover member attachment surface of the housing member 211, to thereby cover an opened portion of the housing groove part 213, so that the second passage part 202B that is part of the secondary air passage 202 and the passage exit 204 are configured.

The cover member 220 is formed of a plate-like member by molding a resin or other materials and has a size large enough to cover the opened portion of the housing groove part 213.

The circuit board 205 is electrically connected to the flow rate detecting element 201, receives an input of the amount of heat radiation from the flow rate detecting element 201, and outputs a signal according to the air flow rate. Various electronic circuit components 206 and conductor wiring (no reference symbol) are placed on the circuit board 205, the flow rate detecting element 201 is also mechanically and electrically connected to the circuit board 205, and the flow rate detecting element 201 is exposed in the secondary air passage 202.

The base member 230 is a plate-like resin molded component made of a synthetic resin material and includes: a flat plate-like board fixing part 301 to which the circuit board 205 is bonded and fixed; and a secondary passage constituting part 302 that forms a first passage part 202A that is part of the secondary air passage 202.

The board fixing part 301 has a size appropriate to close the opening hole 212 of the housing member 211 when the board fixing part 301 is attached to the base member attachment surface of the housing member 211, whereby the circuit board 205 is sandwiched and housed between the board fixing part 301 and the housing member 211.

A base groove part 214 is provided in the secondary passage constituting part 302, and the base groove part 214 forms the first passage part 202A that is part of the secondary air passage 202, in cooperation with the housing member 211 when the base member 230 is joined and combined with the base member attachment surface of the housing member 211.

The base groove part 214 includes: a passage portion 214a that is provided so as to extend from the upstream side toward the downstream side in the forward flow direction; a passage portion 214b bent toward the board fixing part 301 at an end part of the passage portion 214a; and a passage portion 214c that is bent at an end part of the passage portion 214b and extends from the downstream side toward the upstream side in the forward flow direction along the passage portion 214a. The base groove part 214 is formed such that an end part of the passage portion 214c is positioned so as to be opposed to and communicated with the upstream-side end of the housing groove part 213 that is opened so as to pass through the housing member 211.

Figure 3A:
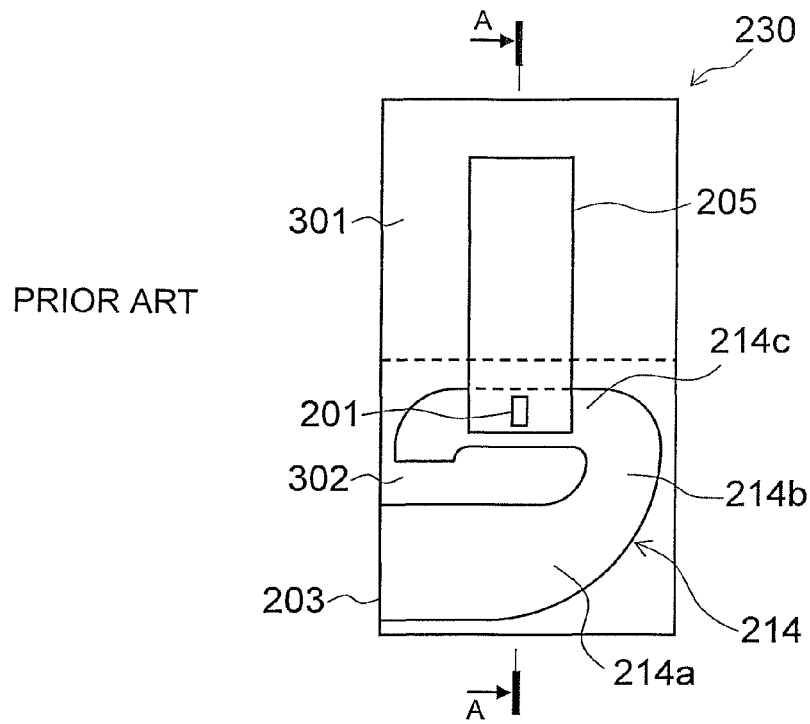
FIGS. 3A and 3B are views each illustrating a conventional base member.
Figure 3B:
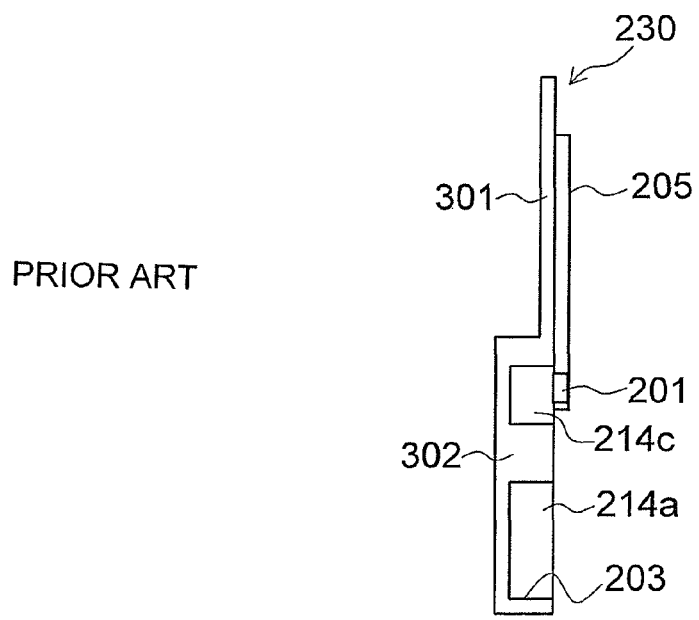
Figure 4A:
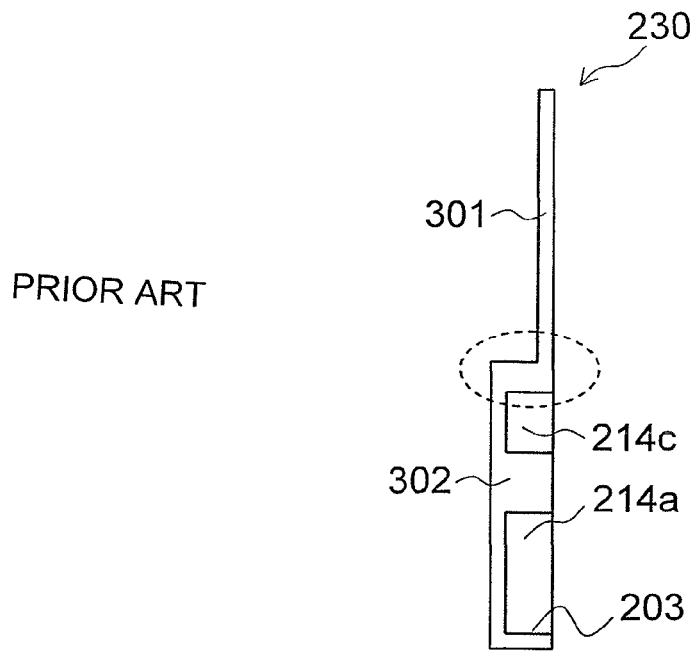
FIGS. 4A and 4B are views for describing a difference in cooling time between a thin part and a thick part.
Figure 4B:
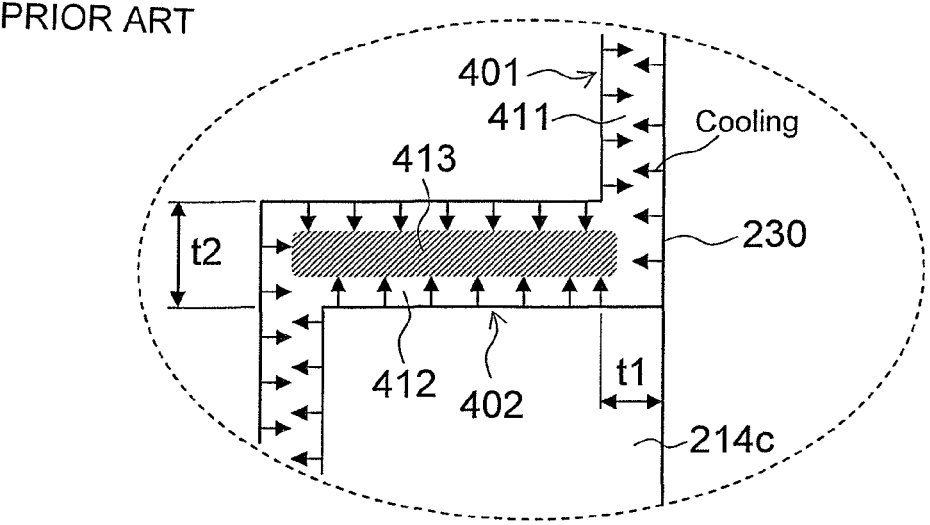
Figure 5A:
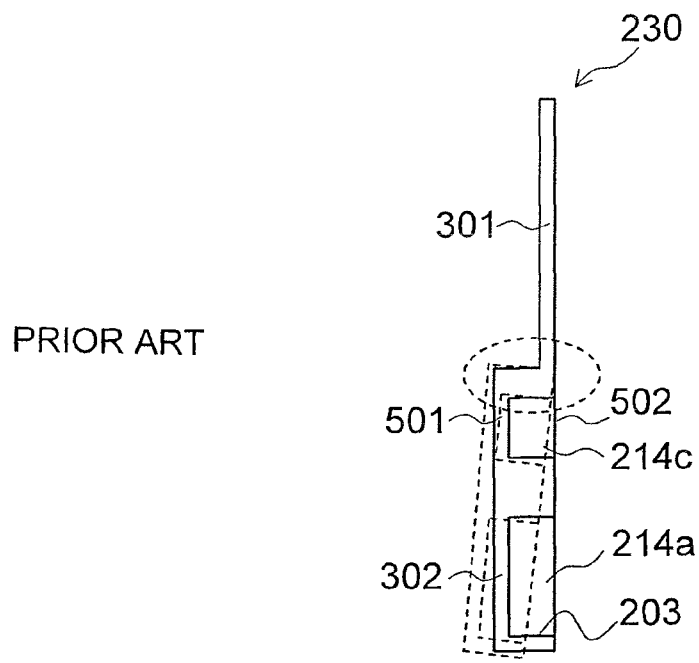
FIGS. 5A and 5B are views each illustrating an example of warpage deformation occurring in a base member.
Figure 5B:
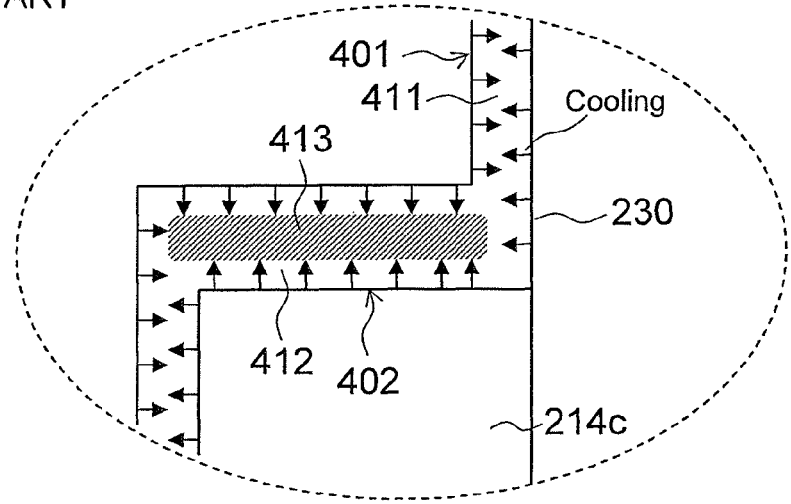

FIG. 3A to FIG. 5B are views for describing a factor that causes warpage deformation of the base member. FIGS. 3A and 3B are views each illustrating only a state where the circuit board 205 is mounted on the base member 230, FIG. 3A is a view illustrating the base member 230 observed from its surface joined to the housing member 211, and FIG. 3B is a cross-sectional view of FIG. 3A taken along the line A-A. FIGS. 4A and 4B are views for describing a difference in cooling time between a thin part and a thick part, and FIGS. 5A and 5B are views each illustrating an example of the warpage deformation occurring in the base member. FIG. 4A and FIG. 5A are cross-sectional views each corresponding to FIG. 3B, and FIG. 4B and FIG. 5B are enlarged views illustrating a main part of FIG. 4A and a main part of FIG. 5A, respectively.

The base member 230 is a resin component integrally including the board fixing part 301 and the secondary passage constituting part 302 and is formed by, for example, injection molding. In the case where the thermal type air flow meter 200 is used for an automobile engine, because the usage environment is harsh, it is general to form the base member 230 by injection molding of polybutylene terephthalate (PBT) resin or other resins called engineering plastic.

The injection molding is a processing method in which a material of the resin is melt at a temperature of 250° C. or higher, is injected by applying a pressure so as to fill a molding die, and thus is molded. After the molding, the material of the resin is left until the temperature thereof cools down, and then is taken out as a completed resin component.

In general, if a resin thickness is made larger in a flat portion 401 that extends in a flat plate-like pattern at a constant plate thickness, such as the board fixing part 301, slight irregularities called a sink occur after the molding. Accordingly, the flat portion 401 as described above is generally molded so as to have a thin resin thickness.

In contrast to this, in the secondary passage constituting part 302, it is necessary to form not only the flat portion 401 but also a vertical wall 402 that erects vertically from the flat portion 401, and hence the shape of the secondary passage constituting part 302 is complicated. Accordingly, a resin thickness of the secondary passage constituting part 302 is not constant, and the resin thickness (t2) thereof is larger than the thin resin thickness (t1) of the flat portion 401 (t2>t1). That is, as illustrated in FIG. 4B, a thin part 411 and a thick part 412 having different resin thicknesses exist in one resin component (base member).

In FIG. 4B, for ease of description, a wall portion vertical (vertical wall 402) to the bonding surface of the circuit board 205 is illustrated as the thick part 412, but this wall portion does not necessarily correspond to the thick part 412.

As described above, in the case of the injection molding, the resin that has been melt at a high temperature is injected into the molding die and thus is molded, and hence if a portion having a different resin thickness exists, there occurs a difference in time until the resin temperature cools down after the molding. That is, as illustrated in FIG. 4B, even if the resin temperature has cooled down in the thin part 411, a phenomenon that the resin temperature has cooled down on the surface of the resin but has not completely cooled down inside thereof occurs in the thick part 412, so that a portion 413 in which cool-down is delayed is generated.

If there occurs a difference in time until the resin temperature cools down between the thin part 411 and the thick part 412 in this way, even when the resin temperature has completely cooled down, a residual stress remains inside of the resin. If such a residual stress remains, deformation called warpage occurs in the shape of the base member 230 as illustrated in, for example, FIG. 5A.

For example, in the structure as illustrated in FIG. 5A, the left side of the secondary passage constituting part 302 of the base member 230 in FIG. 5A is in a restricted state 501 in which a movement is structurally restricted by a resin wall, whereas the right side of the secondary passage constituting part 302 in FIG. 5A is in an opened state 502 in which the structure is opened by the base groove part 214 constituting the secondary air passage 202.

For this reason, due to an influence of the residual stress, the base member 230 is fixed on the restricted side, and the residual stress is released in the direction in which the base member 230 is opened. Accordingly, the base member 230 has a shape opened on the stress-released side, and as a result, has a shape inclined toward the restricted side (the left side of FIG. 5A) as illustrated in FIG. 5A, so that deformation called warpage occurs.

If such warpage deformation occurs and the warpage amount varies for each base member 230, variations occur in a flow passage area of the secondary air passage 202 and in a distance between an inner wall of the secondary air passage 202 and the flow rate detecting element 201, and these variations may affect the measuring accuracy of the flow rate. In addition, the warpage deformation of the base member 230 may affect the joining to the housing member 211 and the bonding property of the circuit board 205. Accordingly, it is necessary to minimize as far as possible the warpage deformation of the base member 230 at the time of the molding.

Figure 6A:
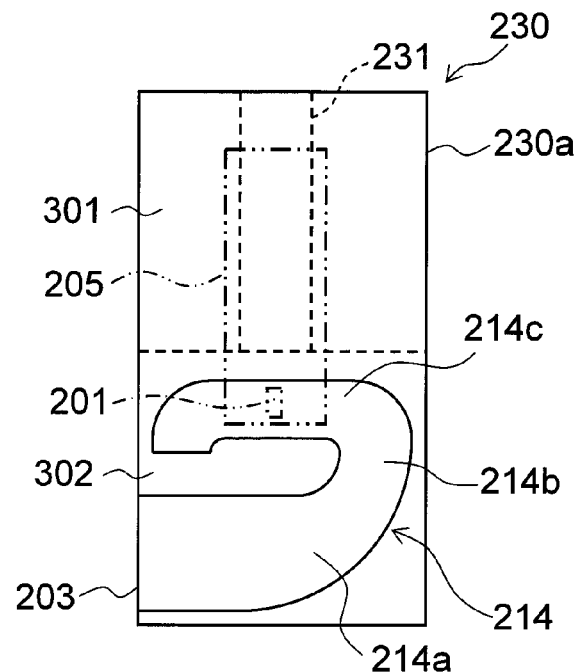
FIGS. 6A, 6B, and 6C are views each illustrating an embodiment.
Figure 6B:
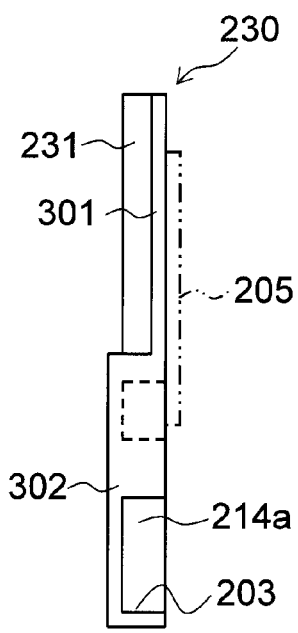
Figure 6C:
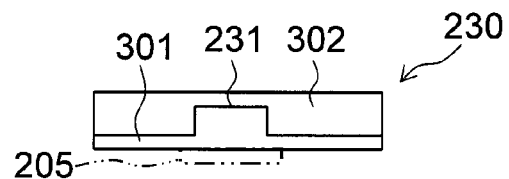

FIGS. 6A, 6B, and 6C are views each illustrating an embodiment of the base member, FIG. 6A is a front view illustrating the base member observed from its surface joined to the housing member, FIG. 6B is a side view observed from the upstream side in the forward flow direction, and FIG. 6C is a plan view.

The base member 230 is provided with a rib 231 as a reinforcing structure for enhancing the strength of the base member 230. According to the same molding method as that of the base member 230, the rib 231 is molded at the same time as the base member 230 with the use of the same resin material and the molding die.

The circuit board 205 (illustrated by a dotted line) on which the flow rate detecting element 201 is placed and the base member 230 are bonded and fixed to each other (an adhesive is not illustrated), and the rib 231 is provided such that a rear surface thereof faces the bonding surface of the circuit board 205. Specifically, the rib 231 is provided so as to protrude from an outer surface of the board fixing part 301 on a side thereof opposite to the housing member 211, and the rib 231 is set at a connection portion between the thin board fixing part 301 to which the circuit board 205 is bonded and the thick secondary passage constituting part 302 in which the wall surface of the first passage part 202A is formed, so as to join together the two parts.

In the present embodiment, the rib 231 is formed so as to protrude from the outer surface of the board fixing part 301 at a central position in the shorter-side direction of the base member 230 and extend from the base end part to the leading end part of the board fixing part 301. Accordingly, for example, in the case where the residual stress that causes the warpage as illustrated in FIG. 5A is applied, the rib 231 serves to prop the structure, whereby the warpage of the base member 230 can be suppressed.

Figure 7A:
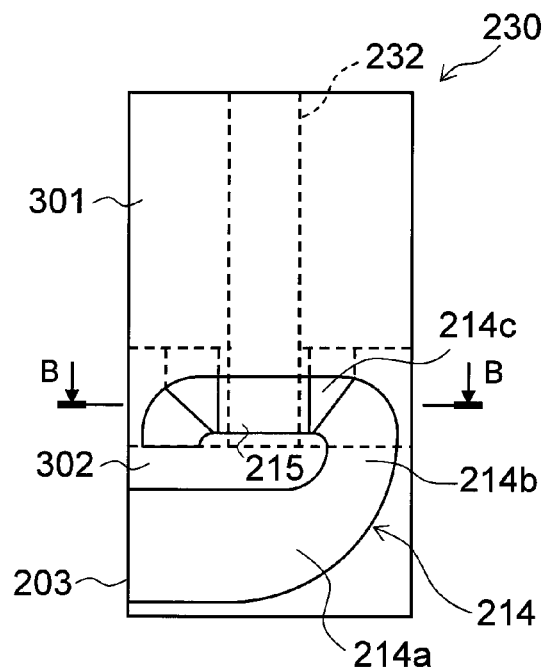
FIGS. 7A, 7B, 7C, and 7D are views each illustrating another embodiment.
Figure 7B:
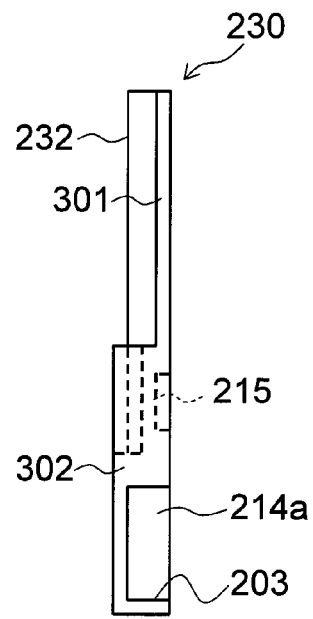
Figure 7C:
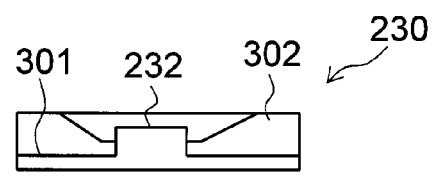
Figure 7D:
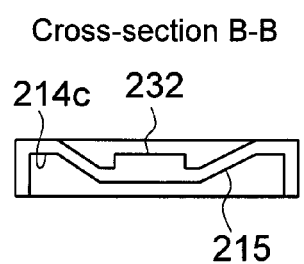

FIGS. 7A, 7B, 7C, and 7D are views each illustrating another embodiment of the base member, FIG. 7A is a front view illustrating the base member observed from its surface joined to the housing member, FIG. 7B is a side view observed from the upstream side in the forward flow direction, FIG. 7C is a plan view, and FIG. 7D is a cross-sectional view of FIG. 7A taken along the line B-B.

A characteristic feature of the present embodiment is that a rib 232 is provided as a reinforcing structure, and the rib 232 extends from the board fixing part 301 to the vicinity of a flow rate measuring part of the secondary passage constituting part 302. It should be noted that constituent elements similar to those in the above-mentioned embodiment are denoted by the same reference symbols, to thereby omit detailed description thereof. In addition, in FIGS. 7A to 7D, illustration of the circuit board 205 and the flow rate detecting element 201 is omitted.

In the case where the flow rate detecting element 201 of the thermal type air flow meter 200 is placed in the secondary air passage 202, it is necessary to measure a stable flow of a fluid to be measured. In a general method adopted for this purpose, the narrowest portion in which a cross-sectional area inside of the secondary air passage 202 is the narrowest is used as a flow rate measuring part, and the flow rate detecting element 201 is placed in the flow rate measuring part. An example of the generally-adopted method includes providing a narrowed-down part 215 inside of the secondary air passage 202 to thereby temporarily narrow down the flow.

The embodiment in which the narrowed-down part 215 is provided inside of the secondary air passage 202 is illustrated in FIGS. 7A to 7D. As illustrated in FIG. 7D, the narrowed-down part 215 has a convex shape that protrudes inside of the secondary air passage 202 at a substantially central position of the passage portion 214c of the base groove part 214, and narrows the flow passage area of the secondary air passage 202 in the width direction.

Accordingly, an outer wall portion of the secondary passage constituting part 302 corresponding to a rear surface of the narrowed-down part 215 has a concave shape. The present embodiment adopts a structure in which the rib 232 extends up to the outer wall portion. With this structure, one continuous rib 232 passes from the board fixing part 301 to the vicinity of the flow rate measuring part. Accordingly, it is possible to achieve stabilization of the fluid to be measured inside of the secondary air passage 202 as well as further enhancement in strength of the base member 230.

With the above-mentioned structure, because the rib 232 extends up to the vicinity of the flow rate measuring part, variations in the flow rate measuring accuracy can be suppressed. Dimension changes such as the cross-sectional area of the flow rate measuring part inside of the secondary air passage 202 and the distance between the flow passage wall and the flow rate detecting element 201 quickly affect the flow rate measuring accuracy. It is preferable that the flow rate detecting element 201 measure the air flow in a stable state, and hence the flow rate detecting element 201 is set at a position having the narrowest cross-sectional area inside of the secondary air passage 202. The cross-sectional area near the passage entrance 203 and the passage exit 204 of the secondary air passage 202 is larger than that of the flow rate measuring part, and hence even if a dimension variation of ±0.1 mm exists, a change in the passage cross-sectional area is small. In contrast, even with the same dimension change of ±0.1 mm, a change in the cross-sectional area of the flow rate measuring part in which the passage cross-sectional area is the narrowest is relatively large compared with those of the passage entrance 203 and the like of the secondary air passage 202, so that a flow rate measuring error accordingly becomes larger. As a matter of course, if the vector of the flow in the flow rate measuring part is changed by an influence of warpage, this directly leads to the flow rate measuring error, and hence the flow rate measuring accuracy can be enhanced by reducing such a dimension change near the flow rate detecting element 201. In the thermal type air flow meter 200 of the present invention, because the rib 232 extends up to the vicinity of the flow rate measuring part inside of the secondary air passage 202, the rigidity of the flow rate measuring part is high, and a change in shape and dimensions of the flow rate measuring part can be reduced, so that the variations in the flow rate measuring accuracy can be suppressed.

Figure 8A:
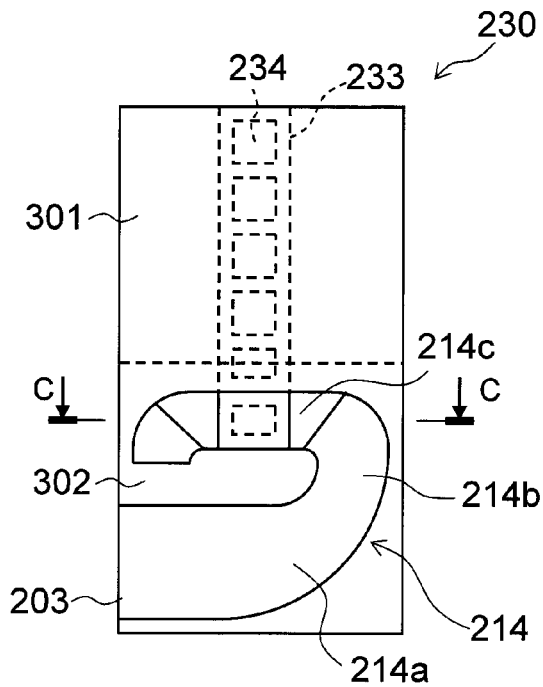
FIGS. 8A, 8B, 8C, and 8D are views each illustrating still another embodiment.
Figure 8B:
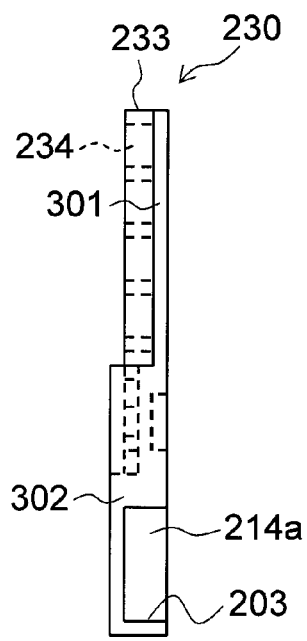
Figure 8C:
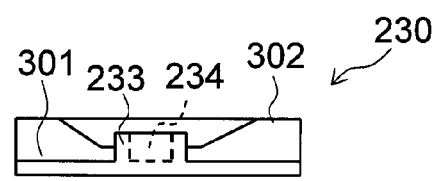
Figure 8D:
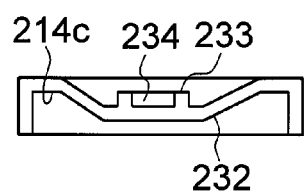

FIGS. 8A, 8B, 8C, and 8D are views each illustrating another embodiment of the base member, FIG. 8A is a front view illustrating the base member observed from its surface joined to the housing member, FIG. 8B is a side view observed from the upstream side in the forward flow direction, FIG. 8C is a plan view, and FIG. 8D is a cross-sectional view of FIG. 8A taken along the line C-C.

A characteristic feature of the present embodiment is that a rib 233 is provided with a hollowed-out part 234 for making the resin thickness of the base member 230 even, and the hollowed-out parts 234 are provided at a plurality of points. In FIGS. 8A to 8D, the hollowed-out parts 234 are provided at totally six points, that is, five points in the board fixing part 301 and one point in the secondary passage constituting part 302, but the number of the hollowed-out parts 234 is not particularly limited.

Similarly to the rib 232 of FIG. 7, the rib 233 is formed so as to extend up to the rear surface of the narrowed-down part 215. Because the base member 230 is provided with the hollowed-out part 234, a thick part formed by the rib 233 is removed, the resin thickness of the entire base member 230 is made even, a difference in time until the resin cools down from high temperature is eliminated, and the dimension accuracy can be secured.

Then, the hollowed-out part 234 thus provided to the rib 233 further advantageously serves to enhance the dimension accuracy of the base member 230.

The rib 233 provided to the base member 230 serves to enhance the strength of the base member 230, but partially forms a thick part on the base member 230. The thick part causes a difference in cooling time until the resin cools down from high temperature after the molding, between the thick part and the thin part, and distortion may occur in the base member 230.

Similarly to warpage, such distortion is a factor for deteriorating the dimension accuracy of the base member 230. Accordingly, in the present embodiment, because the rib 233 is provided with the hollowed-out part 234, the thick part is removed from the base member 230, a difference in time until the resin cools down from high temperature is eliminated, and the dimension accuracy can be secured.

Figure 9A:
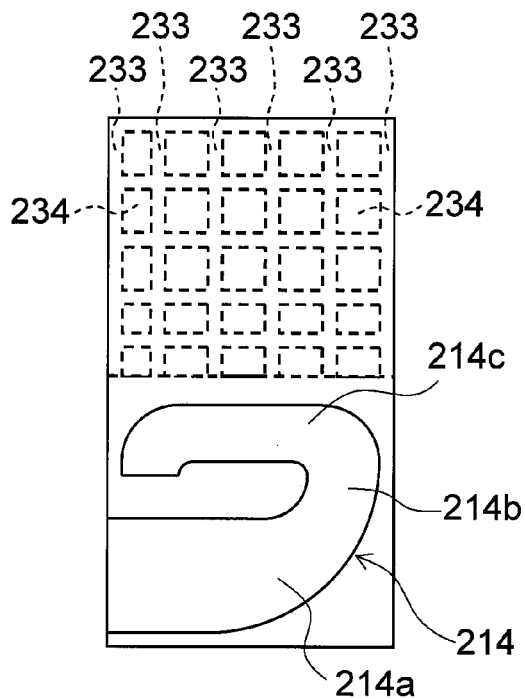
FIGS. 9A, 9B, and 9C are views each illustrating still another embodiment.
Figure 9B:
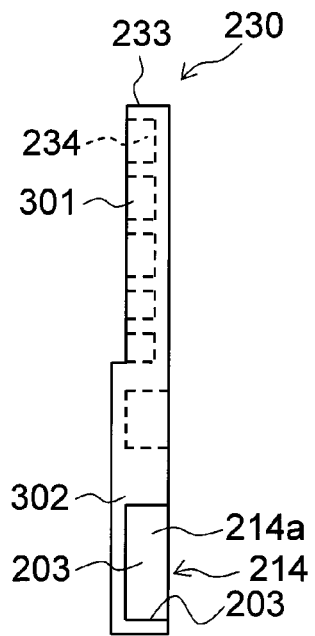
Figure 9C:
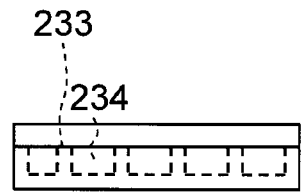

FIGS. 9A, 9B, and 9C are views each illustrating still another embodiment of the base member, FIG. 9A is a front view illustrating the base member observed from its surface joined to the housing member, FIG. 9B is a side view observed from the upstream side in the forward flow direction, and FIG. 9C is a plan view.

A characteristic feature of the present embodiment is that the ribs 233 and the hollowed-out parts 234 as illustrated in FIG. 8 are provided over an entire outer surface of the board fixing part 301. In the structure described in the present embodiment, the plurality of ribs 233 and the plurality of hollowed-out parts 234 are provided only on the outer surface of the board fixing part 301, but the ribs 233 and the hollowed-out parts 234 may be placed similarly on an outer surface of the secondary passage constituting part.

Particularly in the present embodiment, the ribs 233 are provided in a grid pattern, and hence the dimension accuracy of the base member 230 can be further enhanced. As described above in the another embodiment, for example, even the same dimension change of ±0.1 mm has a large influence on the flow rate measuring part and has a small influence on the passage entrance 203 and the passage exit 204 of the secondary air passage 202.

However, if a dimension change is small also at the passage entrance 203 and the passage exit 204 on which the influence is small, the flow rate measuring accuracy is further enhanced. Accordingly, as illustrated in FIGS. 9A to 9C, the ribs 233 are provided in the grid pattern, and the dimension accuracy of the entire base member 230 is enhanced, whereby the flow rate measuring accuracy of the thermal type air flow meter 200 can be further enhanced.

Figure 10A:
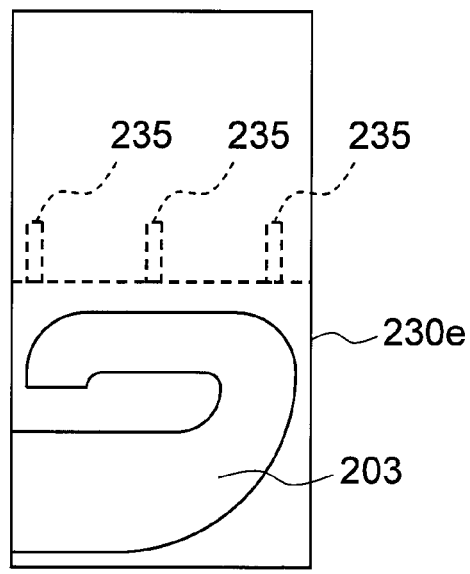
FIGS. 10A, 10B, and 10C are views each illustrating still another embodiment.
Figure 10B:
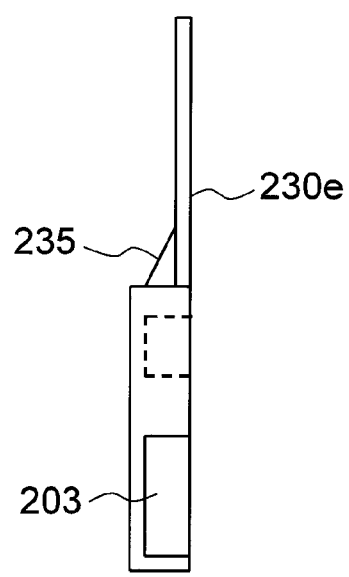
Figure 10C:
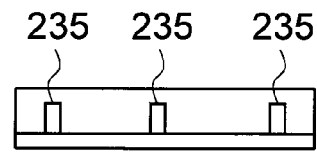

FIGS. 10A, 10B, and 10C are views each illustrating still another embodiment of the base member 230, FIG. 10A is a front view illustrating the base member observed from its surface joined to the housing member, FIG. 10B is a side view observed from the upstream side in the forward flow direction, and FIG. 10C is a plan view.

A characteristic feature of the present embodiment is that a rib 235 serving as a reinforcing structure is partially provided at the connection portion between the board fixing part 301 and the secondary passage constituting part 302 of the base member 230. The rib 235 is provided so as to be interposed between the outer surface of the board fixing part 301 and a vertical surface of the secondary passage constituting part 302 that erects at an end part of the board fixing part 301, and the rib 235 has a right triangle shape that is inclined so as to gradually approach the secondary passage constituting part 302 toward a side farther from the outer surface of the board fixing part 301. Then, a plurality of the ribs 235 are provided at a predetermined interval in the shorter-side direction of the base member 230 corresponding to the forward flow direction, and in the present embodiment, the ribs 235 are provided at totally three points.

Even with the rib 235 having such a simple structure, a sufficient effect of suppressing warpage deformation of the base member 230 can be obtained. In the present embodiment, the number of the ribs 235 is three but is not limited thereto as long as the effect can be obtained, and hence the number thereof may be increased or decreased.

Figure 12:
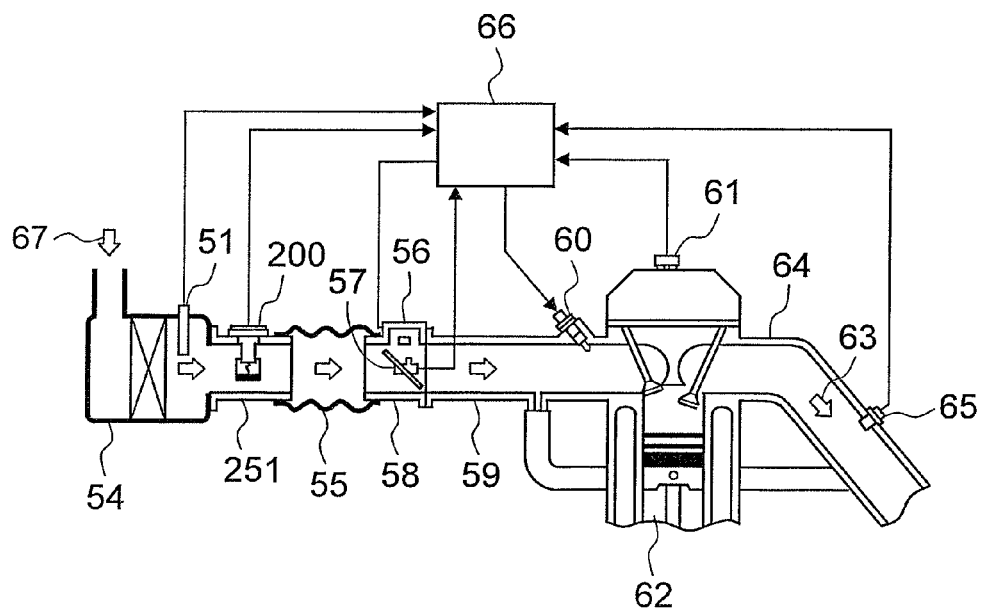
FIG. 12 is a view illustrating a control system of an internal combustion engine.

FIG. 12 is a view illustrating an embodiment in which the present invention is applied to an electronic fuel injection type internal combustion engine. Intake air 67 taken in from an air cleaner 54 passes through the intake pipe constituting member 251 of the thermal type air flow meter 200, an intake duct 55, a throttle body 58, and an intake manifold 59 including an injector 60 to which fuel is supplied, and then, the intake air 67 is taken into an engine cylinder 62. On the other hand, exhaust gas 63 generated in the engine cylinder 62 is discharged through an exhaust manifold 64.

A control unit 66 receives inputs of: an air flow rate signal and a pressure signal outputted from the circuit board 205 of the thermal type air flow meter 200; an intake air temperature signal outputted from a temperature sensor; a throttle valve angle signal outputted from a throttle angle sensor 57; an oxygen concentration signal outputted from an oxygen concentration meter 65 provided to the exhaust manifold 64; an engine rotation speed signal outputted from a rotation speed meter 61; and other signals. The control unit 66 performs sequential arithmetic processing on these signals, to thereby obtain an optimal fuel injection amount and an optimal opening degree of an idle air control valve, and controls the injector 60 and the idle air control valve by using the obtained values.

With the thermal type air flow meter 200 according to the present invention, the plate-like base member 230 is formed by molding a synthetic resin material, and one or more ribs 231 that are integrally formed by using the same resin material as that of the base member 230 are provided on the outer surface of the board fixing part 301 to which the circuit board 205 is bonded and fixed, so that the strength of the base member 230 is enhanced. Accordingly, even in the case where both the thin part 411 and the thick part 412 exist in the base member 230 formed of a single component and thermal contraction is uneven therebetween at the time of the molding, it is possible to suppress warpage deformation of the base member 230 occurring at a boundary between the thick part 412 and the thin part 411.

The present invention is not limited to the structures described above in the embodiments and thus can be variously changed within a range not departing from the gist of the present invention. For example, an element capable of measuring an intake air flow rate and also measuring an air flow direction at the same time may be used as the flow rate detecting element 201. In the first place, a thermal type air flow meter having a function of only measuring a flow rate in a single direction does not need to have the complicated secondary air passage structure, and for example, even the secondary air passage structure as described in JP Patent No. 3523022 fulfills a function as the secondary air passage. In the case of the thermal type air flow meter that measures the intake air flow rate and also measures the air flow direction at the same time, effects of the present invention are more advantageous.

At present, environmental issues such as global warming are attracting attention on a global scale. Accurate measurement of an intake air flow rate leads to optimal fuel control of a vehicle, and this enables not only purification of exhaust gas but also realization of reduced fuel consumption as countermeasures against the environmental issues typified by the global warming. As a result, it is possible to utilize to the maximum fossil fuels whose reserves are considered to be limited. With an internal combustion engine to which the thermal type air flow meter according to the present invention is applied, a flow rate can be obtained with high measuring accuracy, and optimal fuel control can be performed.

DESCRIPTION OF SYMBOLS

51 . . . intake air temperature sensor, 54 . . . air cleaner, 55 . . . duct, 56 . . . idle air control valve, 57 . . . throttle angle sensor, 58 . . . throttle body, 59 . . . intake manifold, 60 . . . injector, 61 . . . rotation speed meter, 62 . . . engine cylinder, 63 . . . gas, 64 . . . exhaust manifold, 65 . . . oxygen concentration meter, 66 . . . control unit, 67 . . . intake air, 200 . . . thermal type air flow meter, 201 . . . flow rate detecting element, 202 . . . secondary air passage, 203 . . . passage entrance, 204 . . . passage exit, 205 . . . circuit board, 206 . . . electronic circuit component, 207 . . . aluminum wire, 208 . . .

connector terminal, 209 . . . fixing screw, 210 . . . air flow inside of secondary air passage, 211 . . . housing member, 220 . . . cover member, 230 . . . resin base member, 231 . . . rib, 233 . . . rib, 234 . . . hollowed-out part, 235 . . . rib, 250 . . . primary air passage, 251 . . . intake pipe constituting member, 252 . . . forward flow inside of primary air passage, 253 . . . backward flow inside of primary air passage

What is claimed is:

1. A thermal type air flow meter comprising:
    a housing member placed in an intake passage of an internal combustion engine;
    a base member fixed to the housing member and includes a secondary passage into which part of air passing through the intake passage flows;
    a flow rate detecting element placed in the secondary passage;
    and a circuit board electrically connected to the flow rate detecting element, receives an input of an amount of heat radiation from the flow rate detecting element, and outputs a signal according to an air flow rate, wherein the base member is a plate shaped resin molded component formed of a synthetic resin material and includes:
    a board fixing part to which the circuit board is fixed;
    a secondary passage constituting part integrally formed with the board fixing part so as to be continuous with a leading end part of the board fixing part and constitutes the secondary passage in cooperation with the housing member; and
    a reinforcing structure provided at at least a connection portion between the board fixing part and the secondary passage constituting part and enhances strength of the member,
    wherein the reinforcing structure includes a rib formed integrally with the base member and is provided between an outer surface of the board fixing part and the secondary passage constituting part so as to protrude from the outer surface, the outer surface being placed on a side opposite to the housing member.

2. The thermal type air flow meter according to claim 1, wherein the rib extends from a base end part to the leading end part of the board fixing part.

3. The thermal type air flow meter according to claim 2, wherein the secondary passage constituting part includes a flow rate measuring part having therein the flow rate detecting element placed in the secondary passage, and wherein the rib extends from the board fixing part to a vicinity of the flow rate measuring part.

4. The thermal type air flow meter according to claim 3, wherein the flow rate measuring part includes a narrowed-down part that narrows a flow passage area of the second passage.

5. The thermal type air flow meter according to claim 4, wherein the rib includes a hollowed-out part that makes a resin thickness of the base member even.

6. The thermal type air flow meter according to claim 4, wherein the reinforcing structure includes a plurality of the ribs.

7. The thermal type air flow meter according to claim 4, wherein the ribs are provided on the outer surface in a grid pattern.

8. The thermal type air flow meter according to claim 3, wherein the rib includes a hollowed-out part that makes a resin thickness of the base member even.

9. The thermal type air flow meter according to claim 3, wherein the reinforcing structure includes a plurality of the ribs.

10. The thermal type air flow meter according to claim 3, wherein the ribs are provided on the outer surface in a grid pattern.

11. The thermal type air flow meter according to claim 2, wherein the rib includes a hollowed-out part that makes a resin thickness of the base member even.

12. The thermal type air flow meter according to claim 2, wherein the reinforcing structure includes a plurality of the ribs.

13. The thermal type air flow meter according to claim 2, wherein the ribs are provided on the outer surface in a grid pattern.

14. The thermal type air flow meter according to claim 1, wherein the rib includes a hollowed-out part that makes a resin thickness of the base member even.

15. The thermal type air flow meter according to claim 14, wherein the rib includes a plurality of the hollowed-out parts at a predetermined interval in a longer-side direction of the rib.

16. The thermal type air flow meter according to claim 15, wherein the reinforcing structure includes a plurality of the ribs.

17. The thermal type air flow meter according to claim 15, wherein the ribs are provided on the outer surface in a grid pattern.

18. The thermal type air flow meter according to claim 14, wherein the reinforcing structure includes a plurality of the ribs.

19. The thermal type air flow meter according to claim 14, wherein the ribs are provided on the outer surface in a grid pattern.

20. The thermal type air flow meter according to claim 1, wherein the reinforcing structure includes a plurality of the ribs.

21. The thermal type air flow meter according to claim 20, wherein the ribs are provided on the outer surface in a grid pattern.

22. The thermal type air flow meter according to claim 1, wherein the ribs are provided on the outer surface in a grid pattern.

* * * * *